(12) United States Patent
Hu et al.

(10) Patent No.: US 11,947,182 B2
(45) Date of Patent: Apr. 2, 2024

(54) OPTICAL ELEMENT DRIVING MECHANISM

(71) Applicant: TDK TAIWAN CORP., Taoyuan (TW)

(72) Inventors: Chao-Chang Hu, Taoyuan (TW); Che-Wei Chang, Taoyuan (TW); Chen-Er Hsu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 328 days.

(21) Appl. No.: 16/728,861

(22) Filed: Dec. 27, 2019

(65) Prior Publication Data
US 2021/0191065 A1    Jun. 24, 2021

Related U.S. Application Data

(60) Provisional application No. 62/785,593, filed on Dec. 27, 2018.

(30) Foreign Application Priority Data

Dec. 20, 2019  (EP) ..................................... 19218902

(51) Int. Cl.
| | | |
|---|---|---|
| G02B 7/04 | (2021.01) | |
| G02B 3/00 | (2006.01) | |
| G02B 3/12 | (2006.01) | |
| G02B 7/09 | (2021.01) | |
| G02B 26/00 | (2006.01) | |
| G02B 27/64 | (2006.01) | |
| G03B 5/00 | (2021.01) | |

(Continued)

(52) U.S. Cl.
CPC ................. *G02B 7/09* (2013.01); *G02B 3/00* (2013.01); *G02B 3/12* (2013.01); *G02B 7/04* (2013.01); *G02B 26/004* (2013.01); *G02B 27/646* (2013.01); *G03B 5/00* (2013.01); *G03B 13/36* (2013.01); *H04N 23/55* (2023.01); *H04N 23/681* (2023.01); *G03B 2205/0007* (2013.01); *G03B 2205/0053* (2013.01); *G03B 2205/0069* (2013.01)

(58) Field of Classification Search
CPC .. G02B 26/004; G02B 26/08; G02B 26/0875; G02B 3/12; G02B 3/14; G02B 7/04; G02B 7/08; G02B 7/09; G02B 7/023; G02B 27/64; G02B 27/646; G02B 1/11; G03B 5/00; G03B 13/36; G03B 2205/00; G03B 2205/0007; G03B 2205/0015; G03B 2205/0023; G03B 2205/0053; G03B 2205/0061; H02K 41/0354; H04N 5/2254; H04N 5/23251
USPC .......................... 359/554, 557, 228, 665, 824
See application file for complete search history.

(56) References Cited

U.S. PATENT DOCUMENTS

| | | | |
|---|---|---|---|
| 2009/0002825 A1* | 1/2009 | Morita .................... | G03B 17/00 359/554 |
| 2016/0259094 A1* | 9/2016 | Aschwanden ........... | G02B 3/14 |

(Continued)

*Primary Examiner* — Marin Pichler
(74) *Attorney, Agent, or Firm* — MUNCY, GEISSLER, OLDS & LOWE, PC

(57) ABSTRACT

A driving mechanism for an optical element is provided, having an optical axis, including a movable part, a fixed part and a driving assembly. The fixed part includes a sidewall parallel to the optical axis. The driving assembly drives the movable part to move relative to the fixed part. The sidewall is not in contact with the driving assembly.

20 Claims, 21 Drawing Sheets

(51) Int. Cl.
*G03B 13/36* (2021.01)
*H04N 5/225* (2006.01)
*H04N 23/55* (2023.01)
*H04N 23/68* (2023.01)

(56) References Cited

U.S. PATENT DOCUMENTS

2019/0104239 A1* 4/2019 Aschwanden ....... H04N 5/2254
2020/0124839 A1* 4/2020 Aschwanden ....... G02B 27/646

* cited by examiner

OPTICAL ELEMENT DRIVING MECHANISM

CROSS-REFERENCE TO RELATED APPLICATIONS

The present application claims priority to U.S. Provisional Patent Application No. 62/785,593, filed on Dec. 27, 2018, and European Patent Application No. 19218902.5, filed on Dec. 20, 2019, the entirety of which are incorporated by reference herein.

BACKGROUND OF THE DISCLOSURE

Field of the Disclosure

The present disclosure relates to an optical element driving mechanism, and more particularly to an optical element driving mechanism of an electrical device.

Description of the Related Art

As the relevant technologies have developed, many electronic devices (such as cameras and smartphones) can record images and videos. However, when a lens having a long focal length is provided in an electronic device, the thickness thereof may be increased, impeding the prospects for miniaturization of the electronic device. Therefore, an optical element driving mechanism capable of minimizing the electrical device is an important issue.

BRIEF SUMMARY OF THE DISCLOSURE

To solve the problems of the prior art, an optical element driving mechanism is provided. The optical element driving mechanism has an optical axis, and includes a movable part, a fixed part and a driving assembly. The fixed part includes a sidewall parallel to the optical axis. The driving assembly drives the movable part to move relative to the fixed part. The sidewall is not in direct contact with the driving assembly.

In one of the embodiments of the present disclosure, the fixed part further includes a base, and the driving assembly includes a piezoelectric element in direct contact with the base. The movable part includes at least three sensing assemblies, the at least three sensing assemblies detect the movement of the movable part relative to the fixed part. The driving assembly includes a piezoelectric element and a deformation element corresponding to the piezoelectric element. The piezoelectric element drives the deformation element to deform, and the piezoelectric element and the deformation element have plate structures. The driving assembly includes at least two piezoelectric elements and at least two deformation elements, and each one of the piezoelectric elements independently drives the corresponding deformation element. An extending direction of the piezoelectric element and the deformation element is parallel to the optical axis.

In one of the embodiments of the present disclosure, the driving assembly further includes a connecting element, the connecting element abuts the deformation element by a friction force. The connecting element is a U-shaped structure. The connecting element includes a non-linear first part and a linear second part. The deformation element includes a contacting surface in contact with the connecting element, and the contacting surface is rigid. The connecting element is in contact with the movable part. The driving element drives the movable part to rotate about a direction perpendicular to the optical axis relative to the fixed part. The movable part includes a fixing element, the driving assembly further includes a connecting element, the movable part is movably connected to the fixed part via the connecting element and the fixing element, the connecting element includes a first part and a second part. The first part has a first surface, the first surface faces away from the movable part. The second part has a second surface, the second surface faces the movable part, and a shortest distance between the second surface and the fixing element is longer than a shortest distance between the first surface and the fixing element. The first part further includes a first opening, the second part further includes a second opening, and a size of the first opening is smaller than a size of the second opening. The fixing element has a first size located at the first surface and a second size located at the second surface, and the first size is greater than the second size. The first surface and the second surface at least partially overlap the fixing element when observed along the optical axis. The second surface is in direct contact with the movable part.

In one of the embodiments of the present disclosure, the fixed part further includes an outer frame, and a gap is provided between the outer frame and the driving assembly. The optical element is a liquid lens, and the liquid lens is disposed on the outer frame. The movable part includes a squeezing ring, the driving assembly drives the squeezing ring to contact the liquid lens.

DETAILED DESCRIPTION OF THE DISCLOSURE

The making and using of optical element driving mechanisms of embodiments of the present disclosure are discussed in detail below. It should be appreciated, however, that the embodiments provide many applicable inventive concepts that can be embodied in a wide variety of specific contexts. The specific embodiments discussed are merely illustrative of specific ways to make and use the embodiments and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
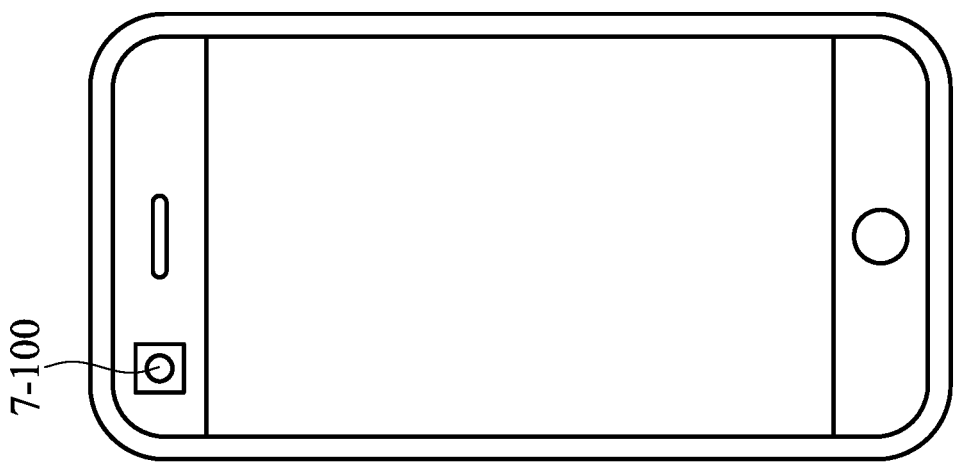
FIG. 1 shows a schematic view of an electrical device with an optical element driving mechanism according to an embodiment of the present disclosure.

Firstly, please refer to FIG. 1, an optical element driving mechanism 7-100 of an embodiment of the present disclosure may be mounted in an electrical device 7-1 for taking photos or videos, wherein the aforementioned electrical device 7-1 may, for example, be a smartphone or a digital camera, but the present disclosure is not limited to these. It should be noted that the position and the size between the optical element driving mechanism 7-100 and the electrical device 7-1 shown in FIG. 1 are only an example, which is not for limiting the position and the size between the optical element driving mechanism 7-100 and the electrical device 7-1. In fact, according to different needs, the optical element driving mechanism 7-100 may be mounted at different positions in the electrical device 7-1.

Figure 2:
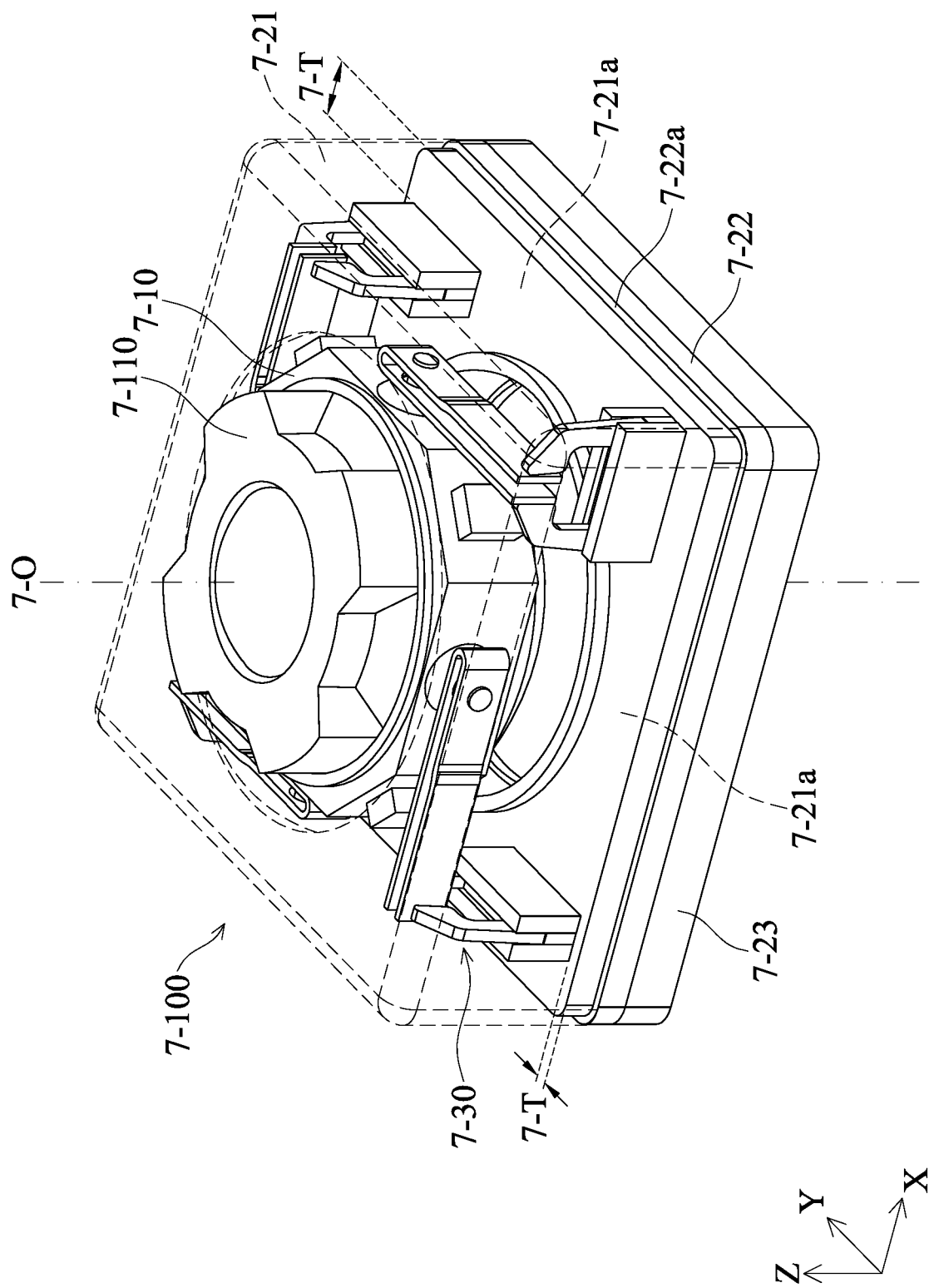
FIG. 2 shows a perspective view of the optical element driving mechanism and an optical element according to an embodiment of the present disclosure, wherein an outer frame of the optical element driving mechanism is shown as a dash-line.
Figure 3:
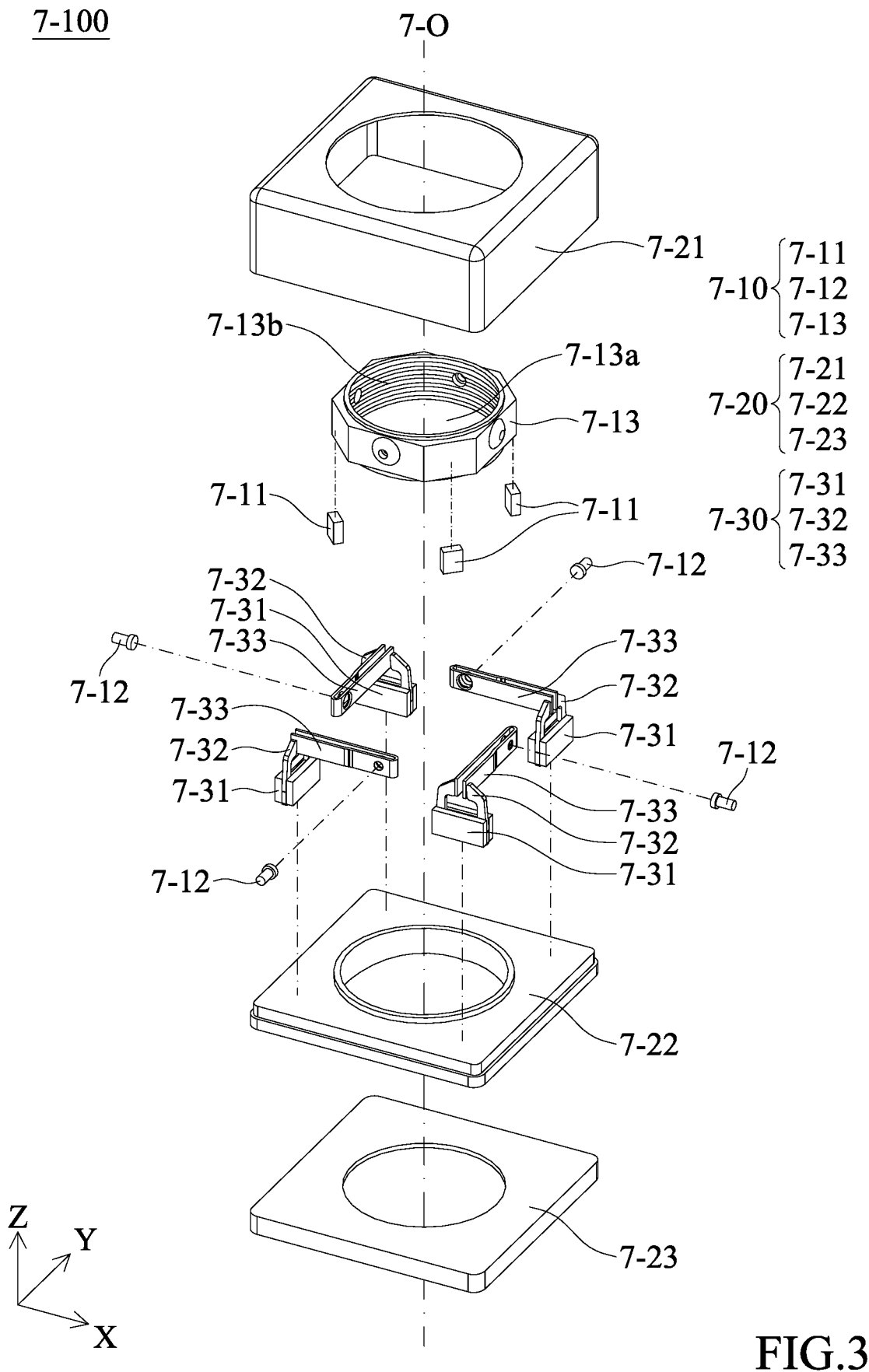
FIG. 3 shows an exploded view of the optical element driving mechanism according to an embodiment of the present disclosure.

Please refer to FIG. 2, the optical element driving mechanism 7-100 has an optical axis 7-O, the optical axis 7-O penetrates the optical element driving mechanism 7-100. Please refer to FIG. 3, the optical element driving mechanism 7-100 includes a movable part 7-10, a fixed part 7-20 and a driving assembly 7-30. The movable part 7-10 includes at least three sensing assemblies 7-11, four fixing elements 7-12 and a holder 7-13. The fixed part 7-20 includes an outer frame 7-21, a base 7-22 and an image sensor holder 7-23. The driving assembly 7-30 includes four piezoelectric elements 7-31, four deformation elements 7-32, and four connecting elements 7-33. Please refer to FIG. 2 again, the movable part 7-10 of the optical element driving mechanism 7-100 is in contact with an optical element 7-110, and the image sensor holder 7-23 is in contact with the base 7-22 and holds an image sensor (not shown). The outer frame 7-21 has four sidewalls 7-21a, the sidewalls 7-21 are parallel to the optical axis 7-O, and a gap 7-T is provided between the outer frame 7-21 and the driving assembly 7-30. By doing so, when the optical element driving mechanism 7-100 is impacted, the collision between the driving assembly 7-30 and the outer frame 7-21 may be avoided, thereby the driving assembly 7-30 are protected from damage. As shown in FIGS. 2 and 3, in the present embodiment, the optical element 7-110 may be a lens. More specifically, the holder 7-13 of the movable part 7-10 has a hollow ring structure and a through hole 7-13a and a threaded structure 7-13b formed on the through hole 7-13a, and the optical element 7-110 may be locked in the through hole 22 via the threaded structure 7-13b.

Figure 4:
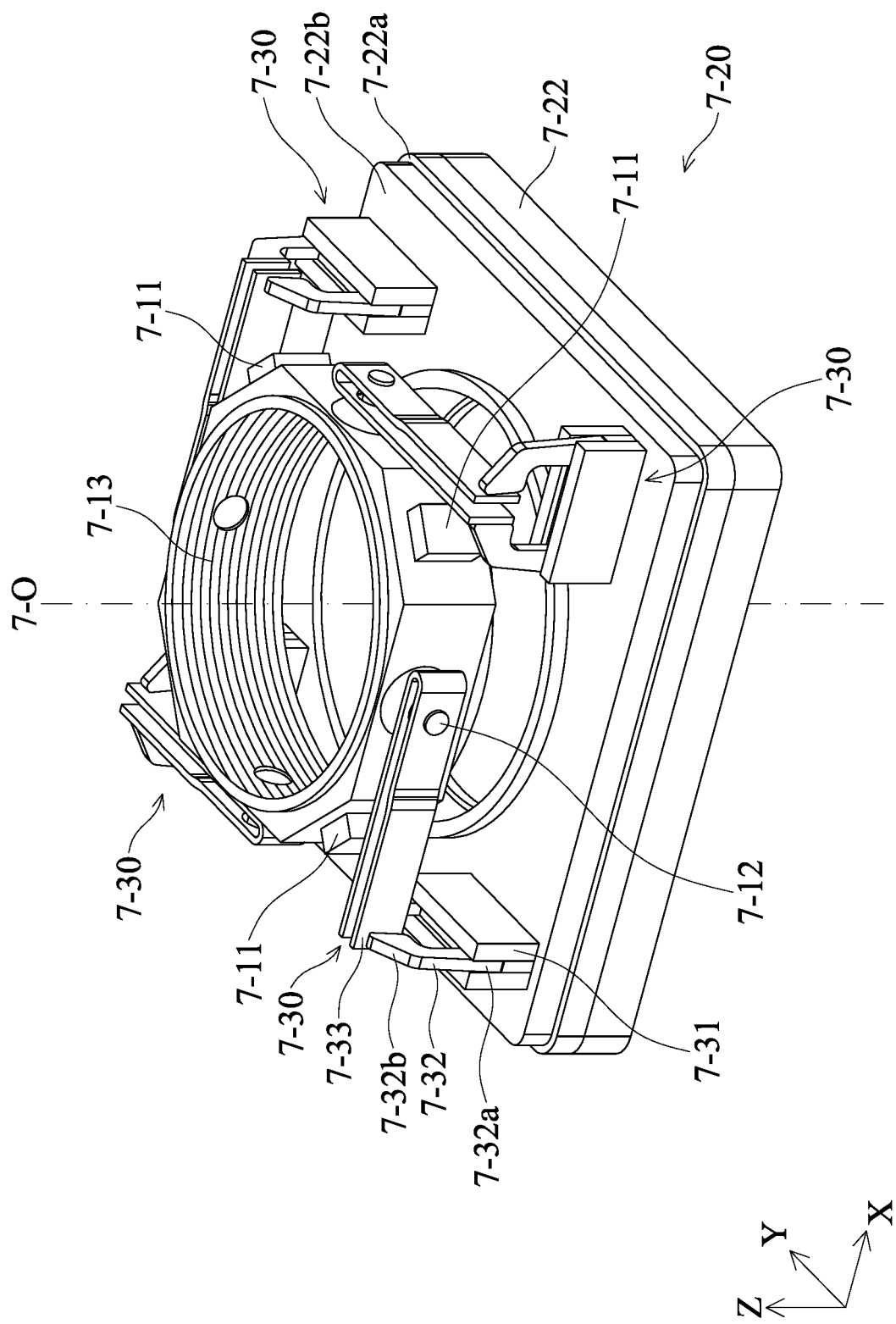
FIG. 4 shows a perspective view of the optical element driving mechanism according to an embodiment of the present disclosure, wherein the outer frame of the optical element driving mechanism is omitted.

Please refer to FIG. 4., the at least three sensing assemblies 7-11 are disposed on the holder 7-13 to detect the motion of the holder 7-13 of the movable part 7-10 relative to the fixed part 7-20. The sensing assemblies 7-11 may be a magnetic element, a magnetic field sensing unit, an optical reference, a light sensing element, or any combination thereof) It should be noted that there may be four or more sensing assemblies. The base 7-22 has a step part 7-22a and a surface part 7-22b. The outer frame 7-21 is disposed on the step part 7-22a (please refer to FIG. 2) to ensure that the outer frame 7-21 is more securely attached to the base 7-22, and this increases the attaching area to lower the level of the motion of the outer frame 7-21 relative to the base 7-22. The piezoelectric elements 7-31 are in direct contact with the surface part 7-22b of the base 7-22, and the piezoelectric elements 7-31 are fixed on the surface part 7-22b. The deformation elements 7-32 correspond to the piezoelectric elements 7-31, and the deformation elements 7-32 are in direct contact with the surface part 7-22b and fixed on the surface part 7-22b. In some embodiments, the driving assembly 7-30 includes at least two piezoelectric elements 7-31 and at least two corresponding deformation elements 7-32, and each one of the piezoelectric elements 7-31 drives the corresponding deformation element 7-32 independently. As shown in FIG. 4, in the present embodiment, the four piezoelectric elements 7-31 are corresponding to the four deformation elements 7-32, and each one of the piezoelectric elements 7-31 drives the corresponding deformation element 7-32 independently. It should be noted that the number of the piezoelectric elements 7-31, the deformation elements 7-32 and the connecting elements 7-33 of the driving assembly 7-30 are not limited to four. In other embodiments, there may be one, two three, or more piezoelectric elements 7-31, deformation elements 7-32, and connecting elements 7-33.

As shown in FIG. 4, lower half parts 7-32a of the deformation elements 7-32 overlaps the piezoelectric elements 7-31 when observing along the direction perpendicular to the optical axis 7-O, and the upper half parts 7-32b of the deformation elements 7-32 is the parts of the deformation elements 7-32 which upwardly expose from the piezoelectric elements 7-31. The piezoelectric elements 7-31 may consist of two pieces of piezoelectric materials, and the two pieces of piezoelectric materials are respectively in contact with the lower half parts 7-32a of the deformation elements 7-32, respectively, so that the piezoelectric elements 7-31 make the deformation elements 7-32 deform along an extension direction parallel to the optical axis 7-O after the piezoelectric materials receive an external current and deform. In other words, after receiving the external current, the extension direction of the piezoelectric elements 7-31 and the deformation elements 7-32 is parallel to the optical axis 7-O. The upper half parts 7-32b of the deformation elements 7-32 are in contact with the connecting elements 7-33, but the upper half parts 7-32b of the deformation elements 7-32 is not in contact with the piezoelectric elements 7-31, and the connecting elements 7-33 are in contact with the holder 7-13. In this way, when the piezoelectric materials deform and make the deformation elements 7-32 deform by receiving the external current, the connecting elements 7-33 move along with the upper half parts 7-32b of the deformation elements 7-32, thereby driving the holder 7-13 to move along the optical axis 7-O relative to the fixed part 7-20. The movable part 7-10 movably connects to the fixed part 7-20 via the connecting elements 7-33 and the fixing element 7-12.

Figure 5:
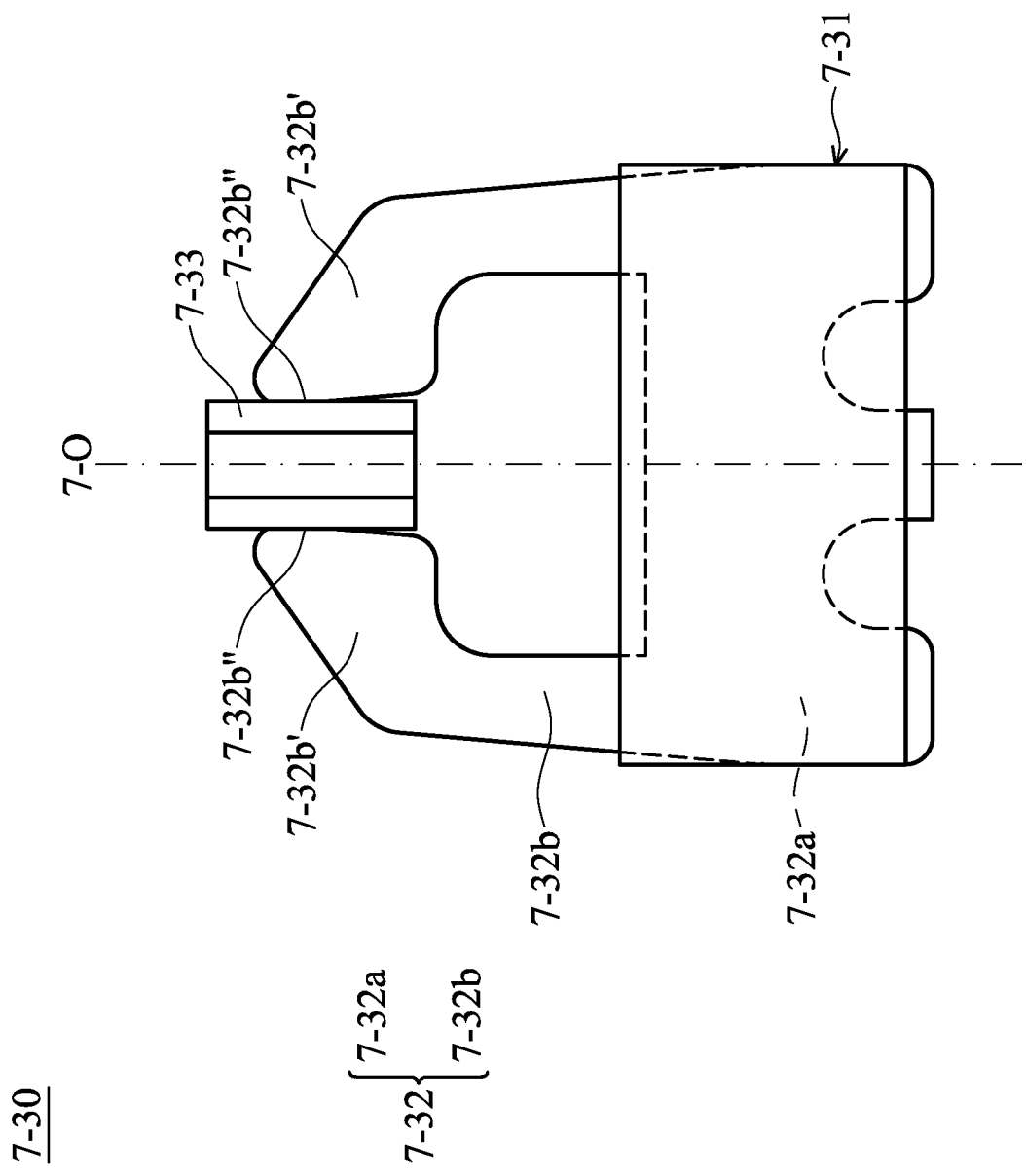
FIG. 5 shows a schematic view of a driving assembly of the optical element driving mechanism according to an embodiment of the present disclosure.

Please refer to FIG. 5, the piezoelectric elements 7-31 and the deformation elements 7-32 have plate structures. In the present embodiment, the lower half parts 7-32a of the deformation elements 7-32 downwardly expose from the piezoelectric elements 7-31 in part, in this way, the contacting area between the deformation elements 7-32 and surface part 7-22b of the base 7-22 is increased, which make the deformation elements 7-32 more securely attach to the surface part 7-22b, and a flexible adhesive material (such as flexible adhesive) may be used so that the deformation elements 7-32 may be roughly secured to the base 7-22 without affecting the motion of the piezoelectric elements 7-31 and the deformation elements 7-32. Furthermore, a supporting structure may be disposed between the deformation elements 7-32 (or the piezoelectric elements 7-31) and the fixed part to certainly limit the position of the piezoelectric elements 7-31 and the deformation elements 7-32. Moreover, the middle parts (which protrude toward the base) of the lower half parts 7-32a may be provided with harder glue, and the two sides parts (which protrude toward the base) are provided with softer glue to improve the adhesion. The upper half part 7-32b of the deformation elements 7-32 has two extension parts 7-32', the extension parts 7-32' extend a distance along a direction substantially parallel to the optical axis 7-O, then the extension parts 7-32' extend along the direction substantially perpendicular to the optical axis 7-O and the extension parts 7-32' are disposed facing to each other. The connecting elements 7-33 are in contact with a contacting surface 7-32b'' of the corresponding extension part 7-32b'. Specifically, the connecting elements 7-33 abut the contacting surface 7-32b'' by friction force. The deformation elements 7-32 may consist of deformable materials (such as metals), while the contacting surfaces 7-32b'' have to be rigid so that the friction force between the contacting surfaces 7-32b'' and the connecting elements 7-33 will not change as the deformation elements 7-32 deform. Furthermore, in other embodiments which are not shown in the figures, a flexible adhesive material may be disposed between the upper half part 7-32b and the fixed part, or between the piezoelectric elements 7-31 and the fixed part.

Figure 6:
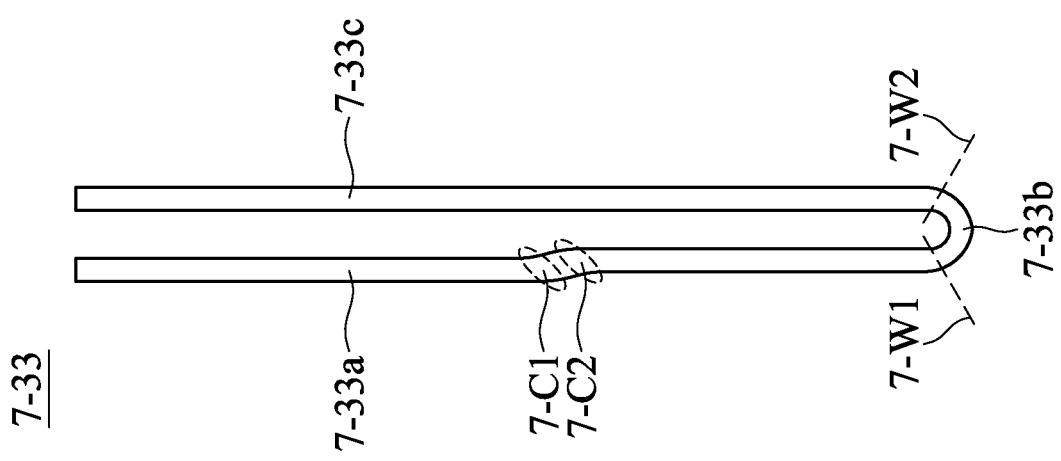
FIG. 6 shows a schematic view of a connecting element of the driving assembly of the optical element driving mechanism according to an embodiment of the present disclosure.

Please refer to FIG. 6, the connecting element 7-33 includes a first part 7-33a, a bending part 7-33b, and a second part 7-33c. The first part 7-33a is directly connected to the bending part 7-33b, and the second part 7-33c is in directly connected to the bending part 7-33b as well, but the first part 7-33a is not directly connected to the second part 7-33c. The dash line W1 is the boundary between the first part 7-33a and the bending part 7-33b, and the dash line W2 is the boundary between the bending part 7-33b and the second part 7-33c. In the embodiment shown in FIG. 6, the first part 7-33a is not linear and has a bending point 7-C1 and a bending point 7-C2, while the second part 7-33c is linear. Generally, the connecting element 7-33 is substantially a U-shaped structure consists of a closed structure and an open structure. The connecting element 7-33 is flexible and has a pre-pressure. The structure of the non-linear first part 7-33a and the linear second part 7-33c of the connecting element 7-33 enables the connecting element 7-33 to apply the pre-pressure effectively, and the pre-pressure drives the first part 7-33a and the second part 7-33c to abut the contacting surface 7-32b'' of the deformation element 7-32 in reverse to ensure that the connecting element 7-33 does not move relative to the contacting surface 7-32h''.

Figure 7:
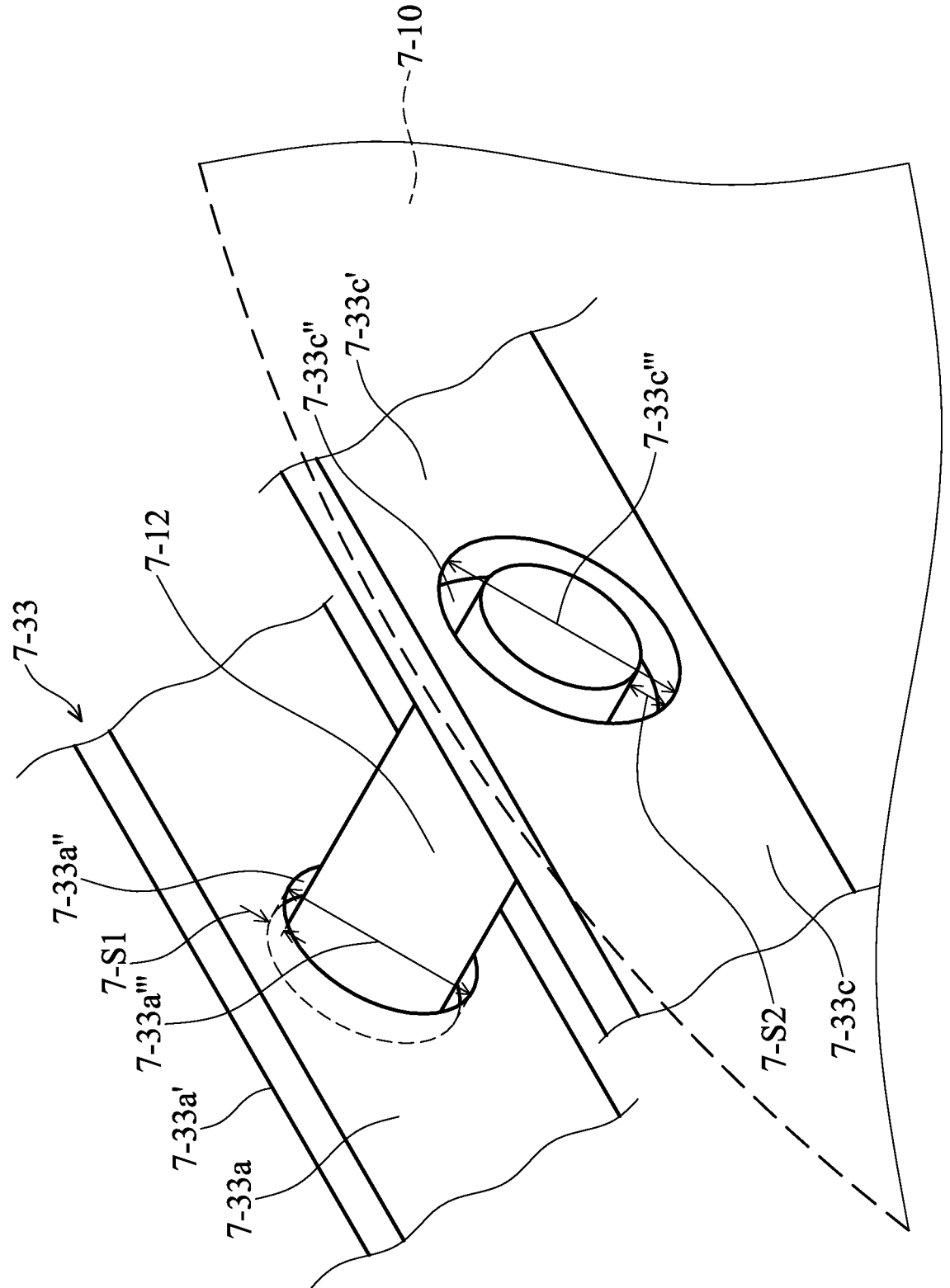
FIG. 7 shows a partial schematic view of a movable part, a first surface, a second surface and a fixing element of the optical element driving mechanism according to an embodiment of the present disclosure.

Please refer to FIG. 7, the first part 7-33a of the connecting element 7-33 has a first surface 7-33a', and the second part 7-33c has a second surface 7-33c'. The first surface 7-33a' faces away from the movable part 7-10, and the second surface 7-33c' faces the movable part 7-10. The first part 7-33a also includes a first opening 7-33a'', and the second part 7-33c also includes a second opening 7-33c''. Generally speaking, the first opening 7-33a'' and the second opening 7-33c'' may be circular openings. However, the shapes of the first opening 7-33a'' and the second opening 7-33c'' may be other, non-circular openings according to actual need. The fixing element 7-12 of the movable part 7-10 penetrates the first opening 7-33a'' and the second opening 7-33c''.

In one embodiment, the size 7-33a''' of the first opening 7-33a'' is smaller than the size 7-33c''' of the second opening 7-33c''. Therefore, the shortest distance 7-S2 between the second surface 7-33c' and the fixing element 7-12 is longer than the shortest distance 7-S1 between the first surface 7-33a' and the fixing element 7-12. In this way, the opening 7-33c'' of the second part 7-33c provides the fixing element 7-12 with more motion space than the first opening 7-33a'' of the first part 7-33a does, so that the holder 7-13 will not be affected by the second opening 7-33c'' when the holder 7-13 rotationally moves relative to the fixed part 7-20, thereby the angle of the rotational motion of the holder 7-13 is not limited by unnecessary limitations.

Figure 8:
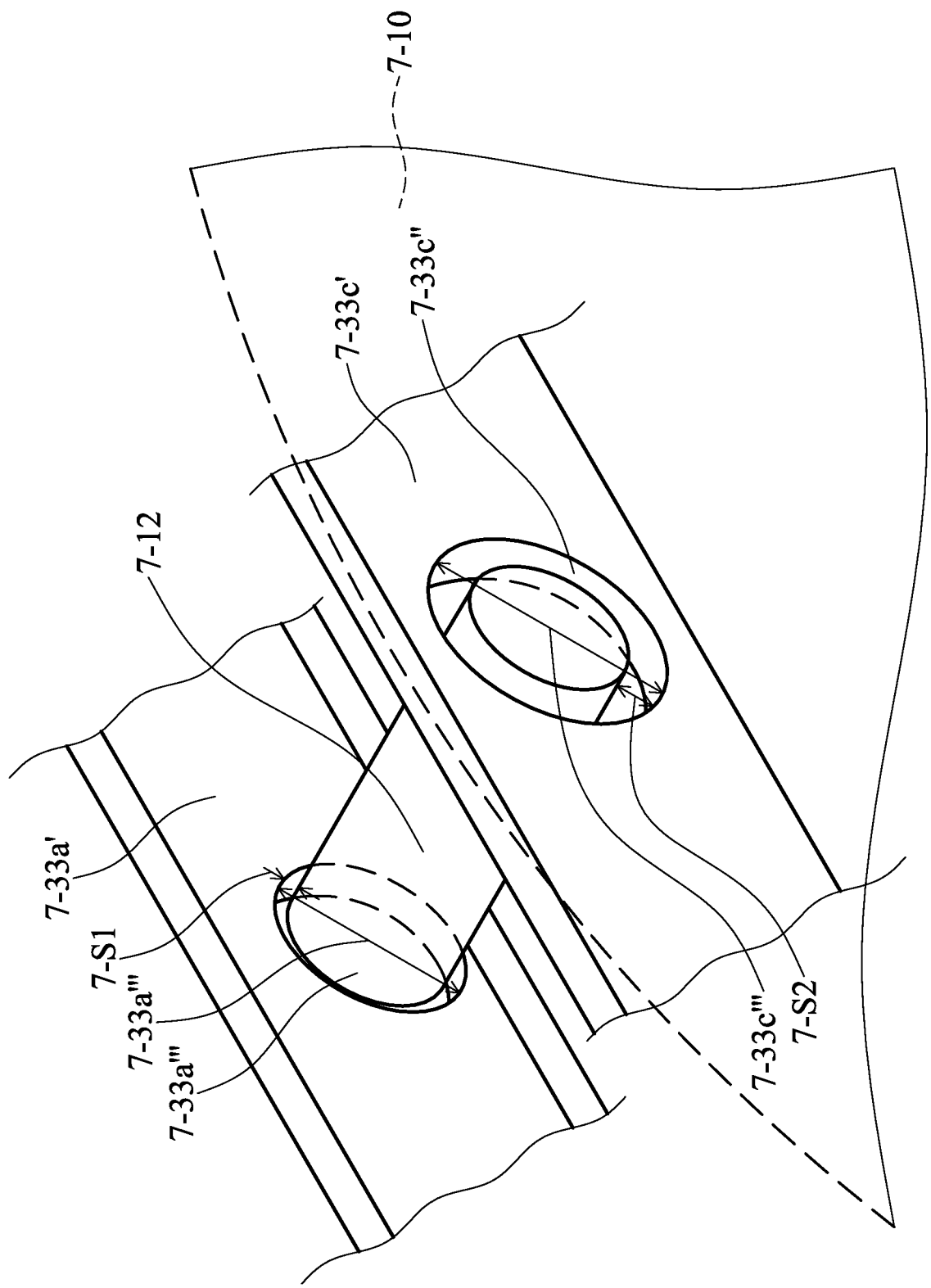
FIG. 8 shows a partial schematic view of a movable part, a first surface, a second surface and the fixing element of the optical element driving mechanism according to another embodiment of the present disclosure.
Figure 9:
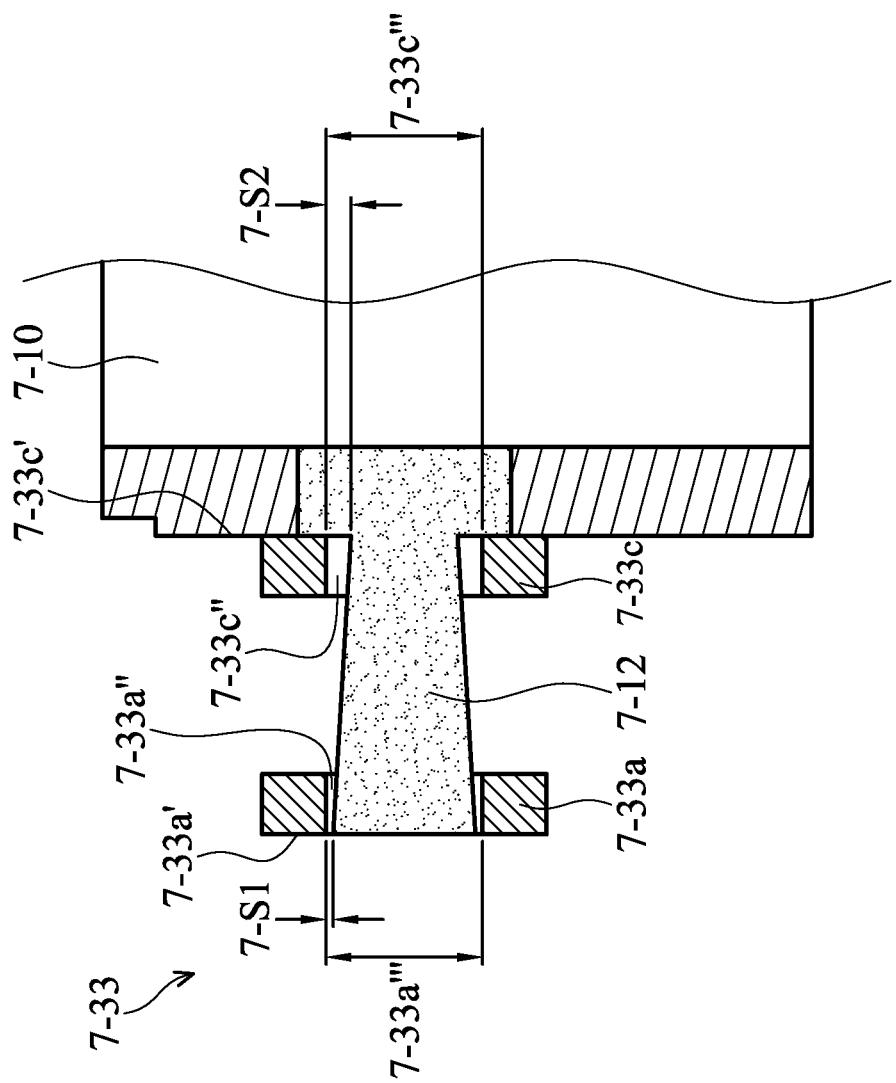
FIG. 9 shows a partial cross-sectional view of the movable part, the first surface, the second surface and the fixing element of the driving assembly of the optical element driving mechanism according to an embodiment of the present disclosure along a line A-A in FIG. 8.

Please refer to FIGS. 8 and 9, in another embodiment, the size 7-33*a*''' of the first opening 7-33*a*'' is the same as the size 7-33*c*''' of the second opening 7-33*c*''. However, the size of the fixing element 7-12 is not constant. The fixing element 7-12 has a first size 7-12*a* at the first opening 7-33*a*'', while the fixing element 7-12 has a second size 7-12*b* at the second opening 7-33*c*'', and the first size 7-12*a* is greater than the second size 7-12*b*. In this configuration, the shortest distance 7-S2 between the second surface 7-33*c*' and the fixing element 7-12 is longer than the shortest distance 7-S1 between the first surface 7-33*a*' and fixing element 7-12. In this way, the second opening 7-33*c*'' of the second part 7-33*c* provides the fixing element 7-12 with more motion space than the first opening 7-33*a*'' of the first part 7-33*a* does, so that the holder 7-13 will not be affected by the second opening 7-33*c*'' when the holder 7-13 rotationally moves relative to the fixed part 7-20, thereby the angle of the rotational motion of the holder 7-13 is not limited by unnecessary limitations.

Figure 10:
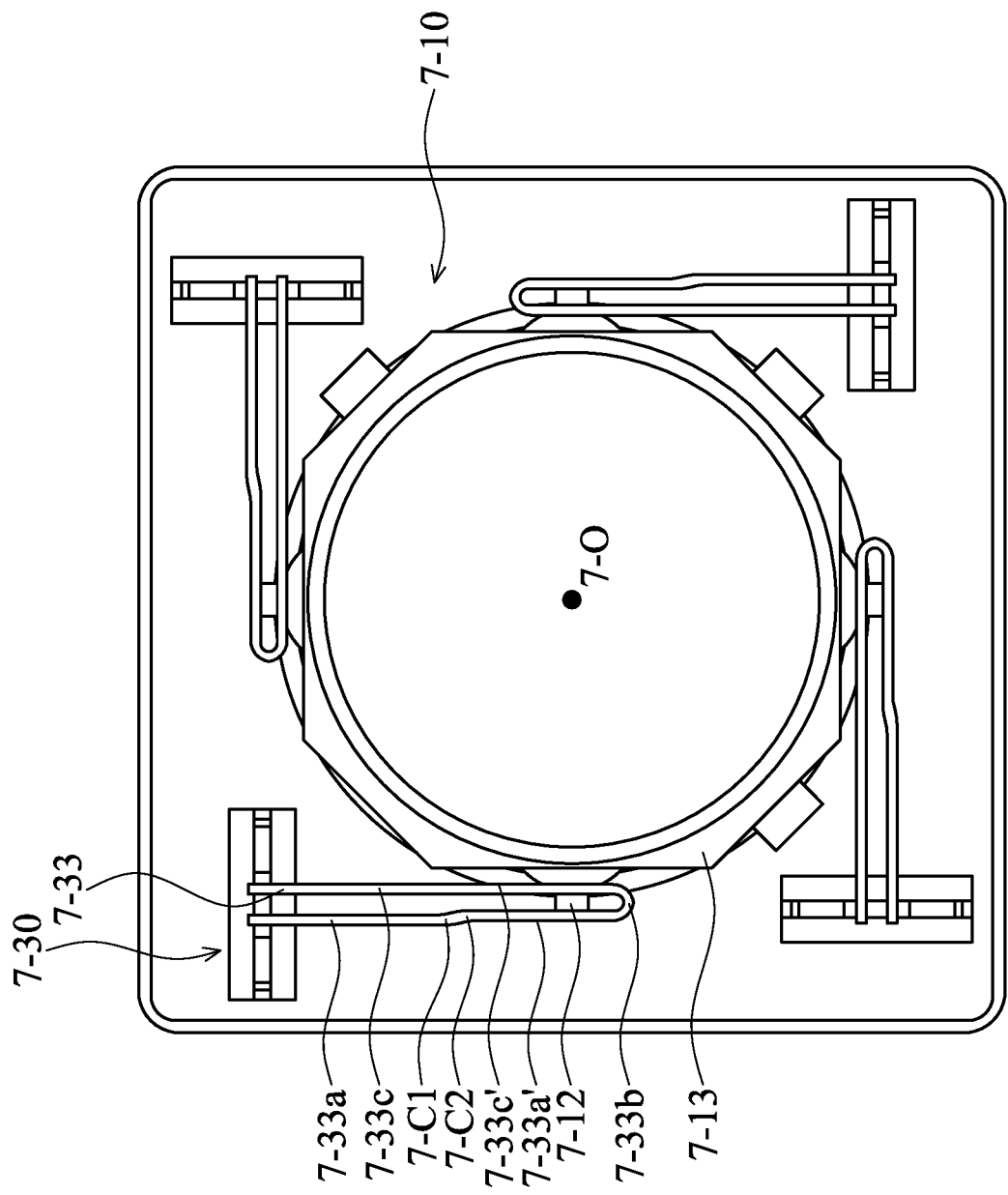
FIG. 10 shows a schematic view of the movable part and the driving assembly of the optical element driving mechanism according to an embodiment of the present disclosure.

Please refer to FIG. 10, after extending along the direction perpendicular to the optical axis 7-O, the second part 7-33*c* of the connecting element 7-33 of the driving assembly 7-30 is in contact with the holder 7-13 of the movable part 7-10. After extending along the direction perpendicular to the optical axis 7-O, and after bending at the bending point 7-C1 and the bending point 7-C2 of the first part 7-33*a*, the first part 7-33*a* of the connecting element 7-33 extends along the direction substantially parallel to the original extending direction and connects to the bending part 7-33*b*. It should be noted that the first part 7-33*a* between the bending point 7-C2 and the is bending part 7-33*b* closer to the holder 7-13 than that between the bending point 7-C1 and the connecting element 7-33, and the first part 7-33*a* is not in contact with the holder 7-13. Moreover, the fixing element 7-12 and the second surface 7-33*c*' are in direct contact with the holder 7-13 to make sure that the holder 7-13 comes into contact with the connecting element 7-33 and to movably connect the holder 7-13 to the connecting element 7-33. Since the fixing element 7-12 penetrates the first opening 7-33*a*'' of the first part 7-33*a* and the second opening 7-33*c*'' of the second part 7-33*c* (please refer to FIGS. 7, 8 and 9), the first part 7-33*a* and the second part 7-33*c* at least partially overlap the fixing part 7-12 when observed along the optical axis. It should be noted that, in the embodiment shown in FIG. 10, the fixing element 7-12 does not protrude from the first part 7-33*a*. In this way, the unnecessary contact between the fixing element 7-12 and the other elements of the optical element driving mechanism 7-100 can be avoided, and the effect of minimization can be achieved.

Figure 11:
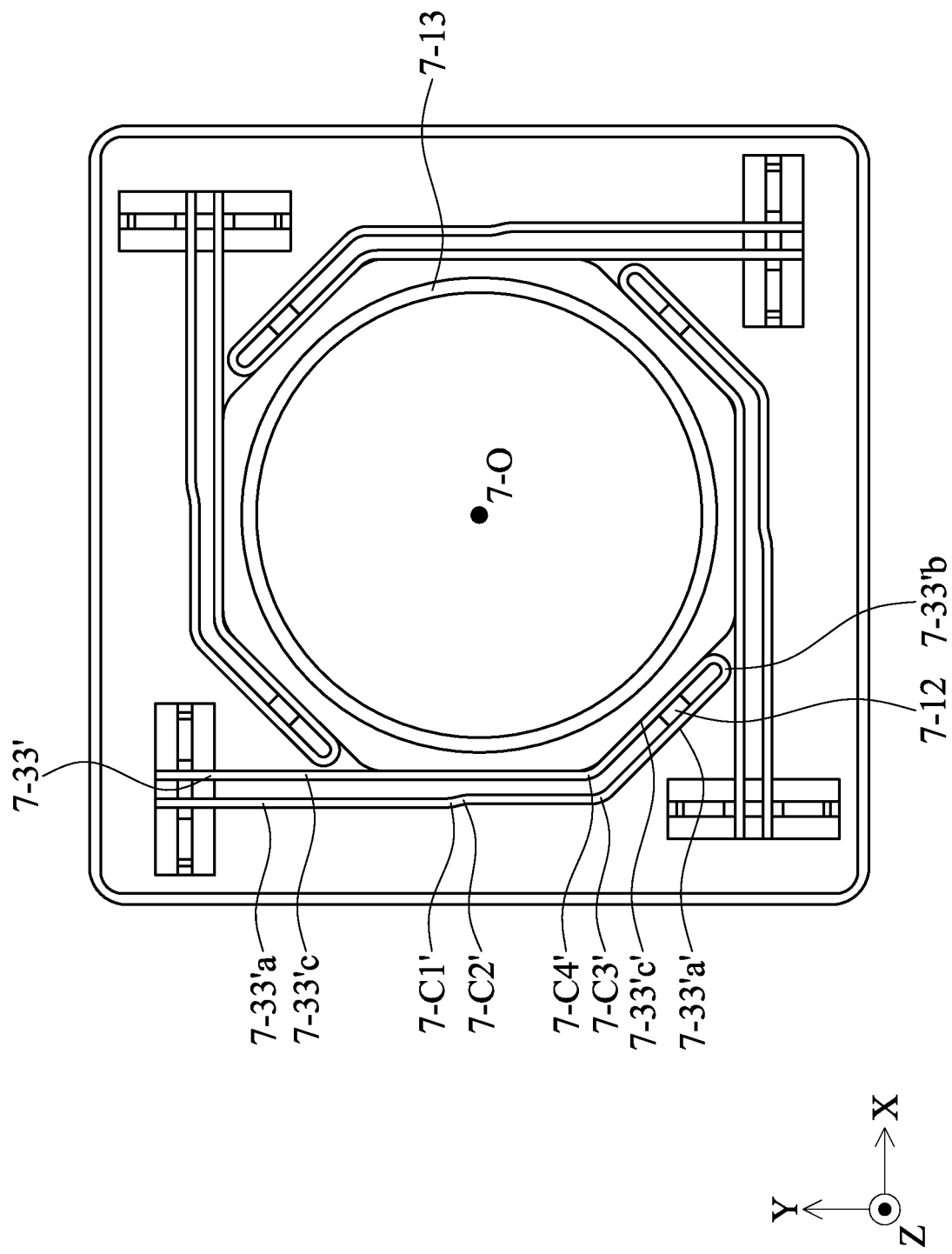
FIG. 11 shows a schematic view of the movable part and the driving assembly of the optical element driving mechanism according to another embodiment of the present disclosure.

Please refer to FIG. 11, in the embodiment shown in FIG. 11, the first part 7-33'*a* of the connecting element 7-33' has a bending point 7-C1', a bending point 7-C2' and a bending point 7-C3'. The second part 7-33'*c* is not linear, and the second part 7-33'*c* has a bending point 7-C4'. After extending along the direction perpendicular to the optical axis 7-O, the second part 7-33'*c* is in contact with the holder 7-13 of the movable part 7-10, bends an angle at the bending point 7-C4' of the second part 7-33'*c*, extends again along another direction perpendicular to the optical axis 7-O, keeps in contact with the holder 7-33, and connects to the bending part 7-33'*b*. After extending along the direction perpendicular to the optical axis 7-O, and after bending at the bending point 7-C1' and the bending point 7-C2' of the first part 7-33'*a*, the first part 7-33'*a* of the connecting element 7-33' continues to extend along the direction substantially parallel to the original extending direction of the first part 7-33'*a*. The first part 7-33'*a* then continues to extend along the direction substantially parallel to the second part 7-33'*c* and connects to the bending part 7-33'*b* after the first part 7-33'*a* bends at the bending point 7-C3' by the angle substantially the same as the angle at the bending point 7-C4' of the second part 7-33'*c*. It should be noted that the first part 7-33'*a* between the bending point 7-C2' and the bending part 7-33'*b* is closer to the holder 7-13 than that between the bending point 7-C1' and the connecting element 7-33', and the first part 7-33'*a* is not in contact with the holder 7-13. Compared with the connecting element 7-33 in the embodiment shown in FIG. 10, the connecting element 7-33' in the embodiment shown in FIG. 11 has a greater length, better stress distribution, and higher mechanical strength, and makes it less likely to break during impact. The fixing element 7-12 and the second surface 7-33'*c*' is in direct contact with the holder 7-13 to make sure that the holder 7-13 comes into contact with the connecting element 7-33 and to movably connect the holder 7-13 to the connecting element 7-33. Since the fixing element 7-12 penetrates the first opening 7-33'*a*'' of the first part 7-33'*a* and the second opening 7-33'*c*'' of the second part 7-33'*c* (similar to the embodiments shown in FIGS. 7, 8 and 9), the first part 7-33'*a* and the second part 7-33'*c* at least partially overlap the fixing part 7-12 when observed along the optical axis 7-O. It should be noted that, in the embodiment shown in FIG. 11, the fixing element 7-12 does not protrude from the first part 7-33'*a*. In this way, the unnecessary contact between the fixing element 7-12 and the other elements of the optical element driving mechanism 7-100 can be avoided, and the effect of minimization can be achieved.

Figure 12:
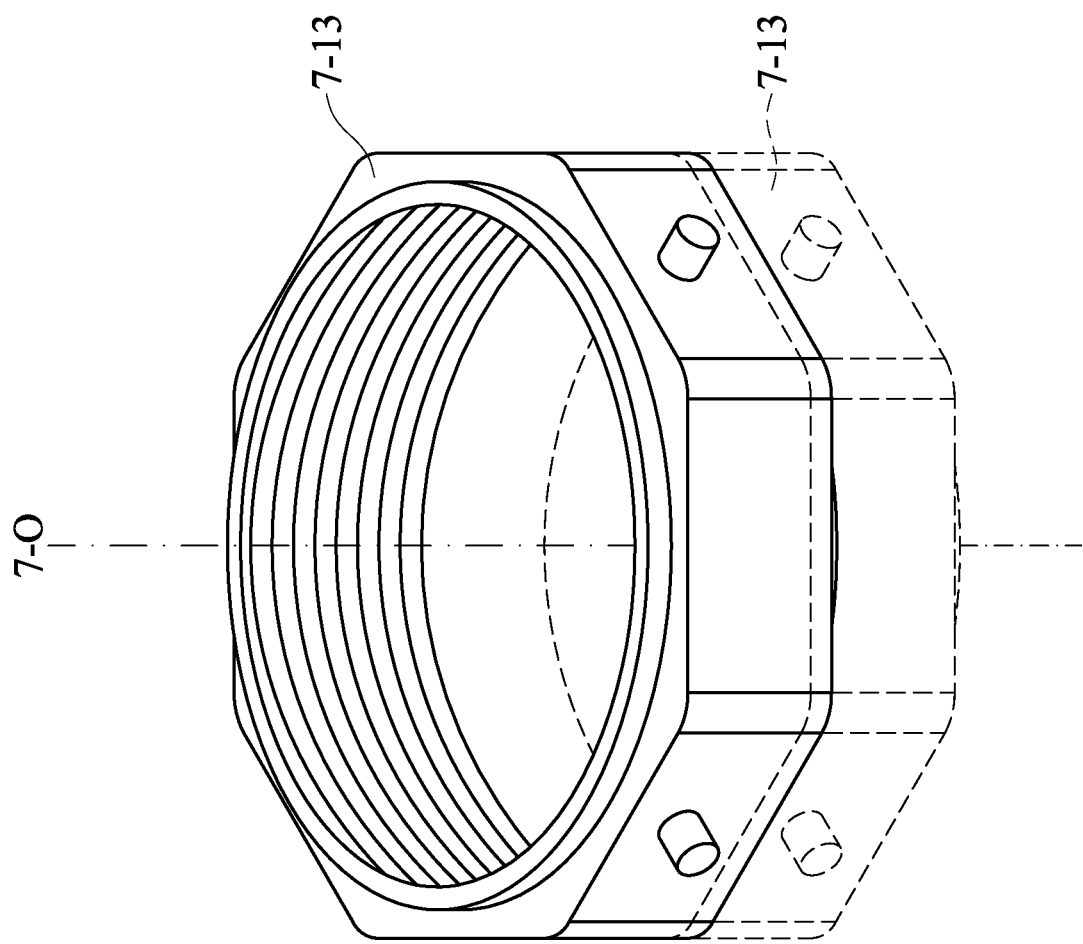
FIG. 12 shows a schematic view of the translational motion of a holder of the movable part of the optical element driving mechanism according to an embodiment of the present disclosure.
Figure 13:
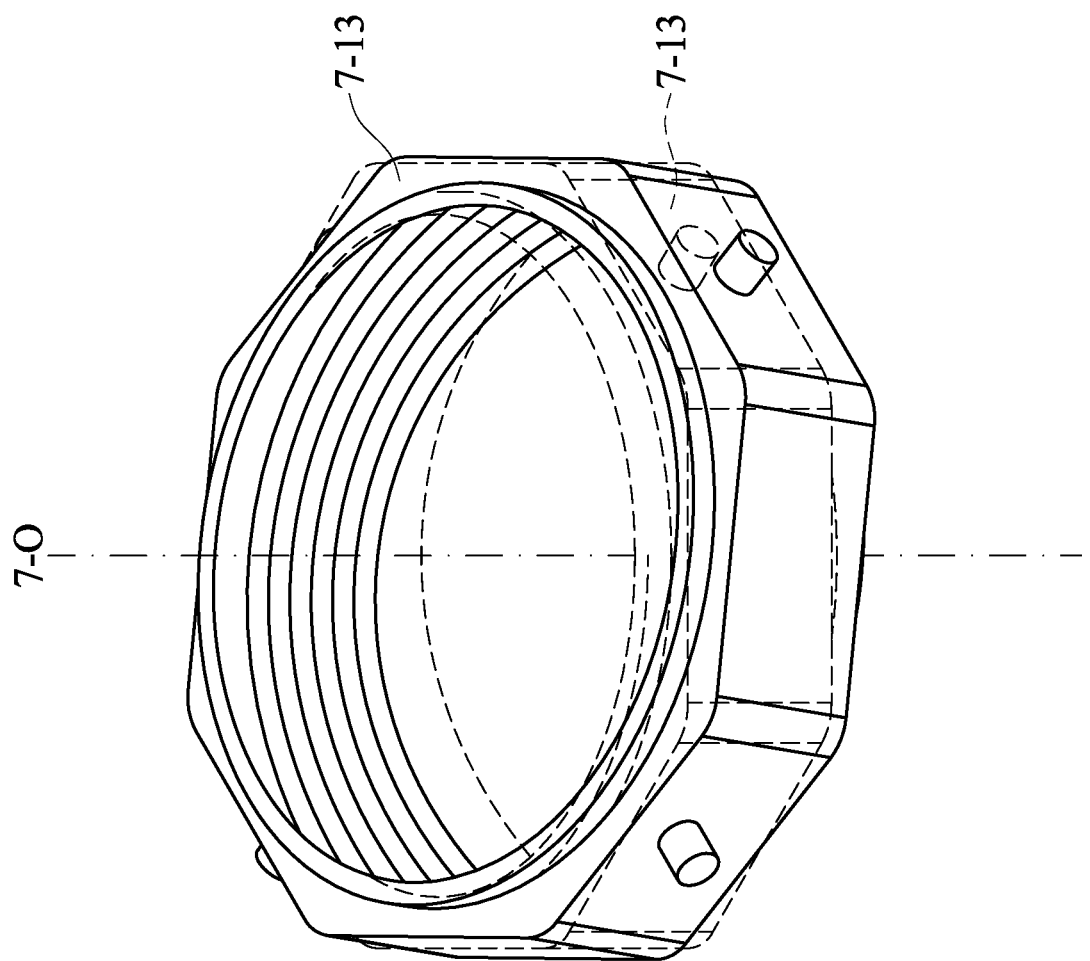
FIG. 13 shows a schematic view of the rotational motion of the holder of the movable part of the optical element driving mechanism according to an embodiment of the present disclosure.
Figure 14:
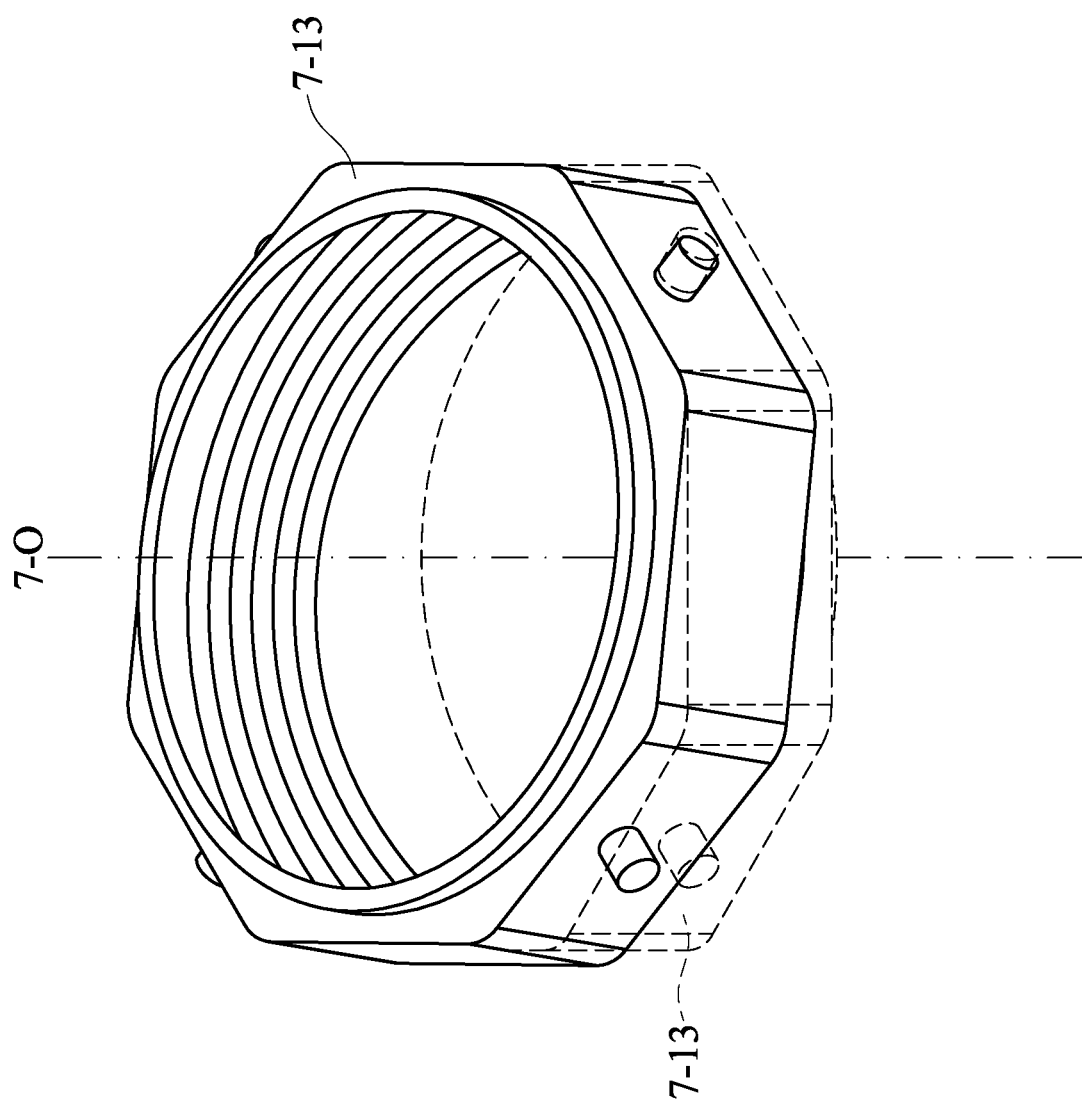
FIG. 14 shows a schematic view of the translational motion and the rotational motion of the holder of the movable part of the optical element driving mechanism according to an embodiment of the present disclosure.

Please refer to FIG. 12, the driving assembly 7-30 drives the holder 7-13 of the movable part 7-10 to move along the direction parallel to the optical axis 7-O relative to the fixed part 7-20 when the displacements of each one of the piezoelectric elements 7-31 and each one of the corresponding deformation elements 7-32 of the driving assembly 7-30 are the same, and the translational motion of the holder 7-13 of the movable part 7-10 is achieved, wherein the dash line indicates the initial position of the holder 7-13. Please refer to FIG. 13, in one case, the driving assembly 7-30 drives the holder 7-13 of the movable part 7-10 to rotate about the direction perpendicular to the optical axis 7-O relative to the fixed part 7-20 when the displacements of the piezoelectric elements 7-31 and the deformation elements 7-32 of the driving assembly 7-30 are different, and the rotational motion of the holder 7-13 of the movable part 7-10 is achieved, wherein the dash line indicates the initial position of the holder 7-13. Please refer to FIG. 14, in another case, the driving assembly 7-30 drives the holder 7-13 of the movable part 7-10 move along the direction parallel to the optical axis 7-O and to rotate about the direction perpendicular to the optical axis 7-O relative to the fixed part 7-20 when the displacements of the piezoelectric elements 7-31 and the deformation elements 7-32 of the driving assembly 7-30 are different, and the translational motion and the rotational motion of the holder 7-13 of the movable part 7-10 is achieved, wherein the dash line indicates the initial position of the holder 7-13.

Figure 15:
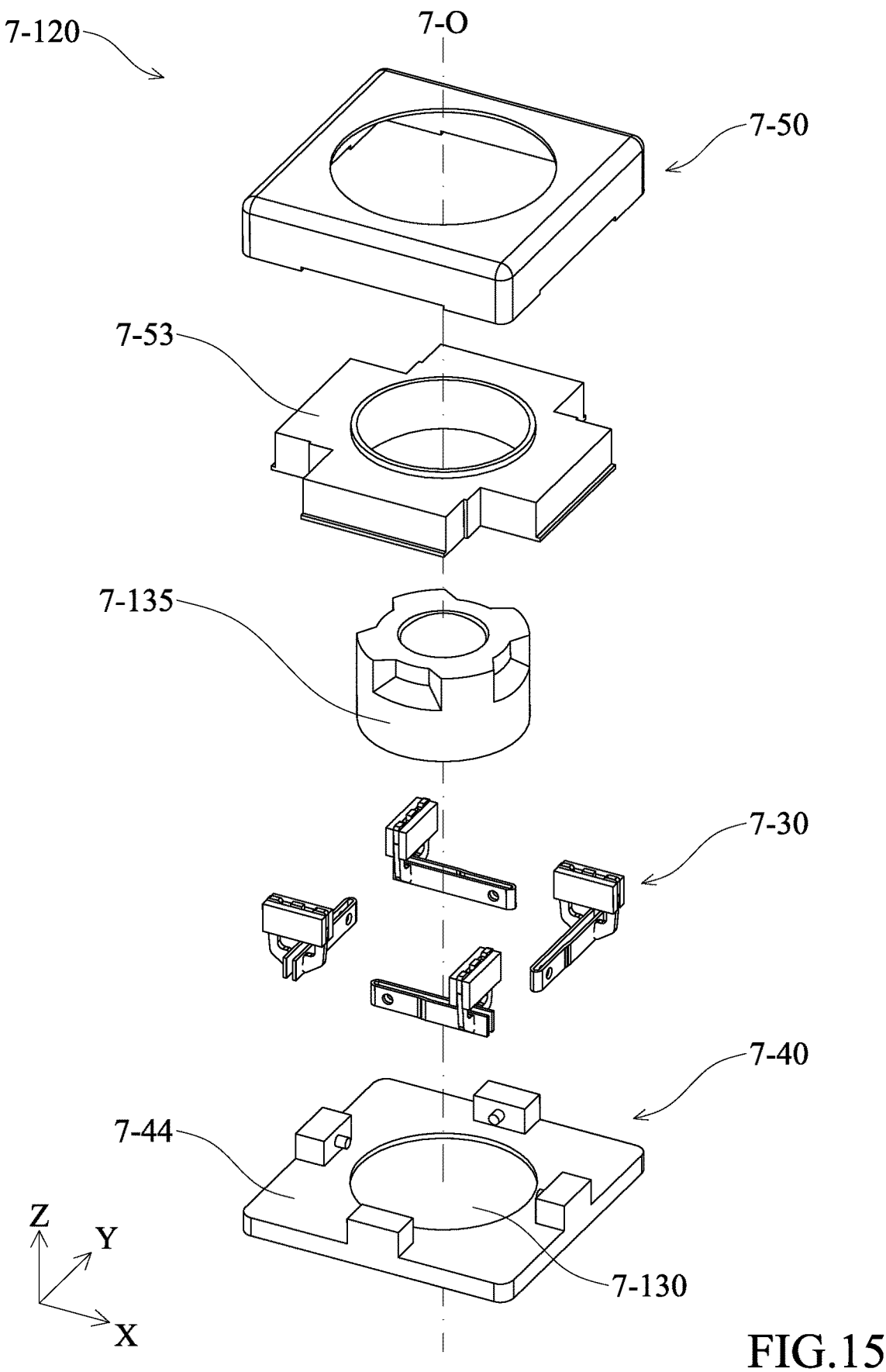
FIG. 15 shows an exploded view of the optical element driving mechanism and the optical element according to an embodiment of the present disclosure.

Please refer to FIG. 15, an optical element driving mechanism 7-120 of another embodiment of the present disclosure includes a movable part 7-40, a fixed part 7-50 and a driving assembly 7-30. Compared with the optical element driving mechanism 7-100, the movable part 7-40 of the optical element driving mechanism 7-120 has no holders, but the movable part 7-40 further includes an image sensor holder 7-44. The fixed part 7-50 of the optical element driving mechanism 7-120 has no image sensor holders, but the fixed part 7-50 further includes a holder 7-53. The features of the driving assembly 7-30 of the optical element driving mechanism 7-120 are the same as the features of the driving assembly 7-30 of the optical element driving mechanism 7-100. The main structures, functions and configuration of the optical element driving mechanism 7-120 same as the configuration of the elements of the optical element driving mechanism 7-100 are not repeated again. In the present embodiment, the optical element 7-130 is an imaging sensor disposed on the image sensor holder 7-44, while the optical element 7-135 is an ordinary lens. That is, in the present embodiment, the holder 7-53 does not move relative to the fixed part 7-50, the image sensor holder 7-44 of the movable part 7-40 moves relative to the fixed part 7-50 by means of the driving assembly 7-30, thereby driving the image sensor to move relative to the fixed part 7-50.

Figure 16:
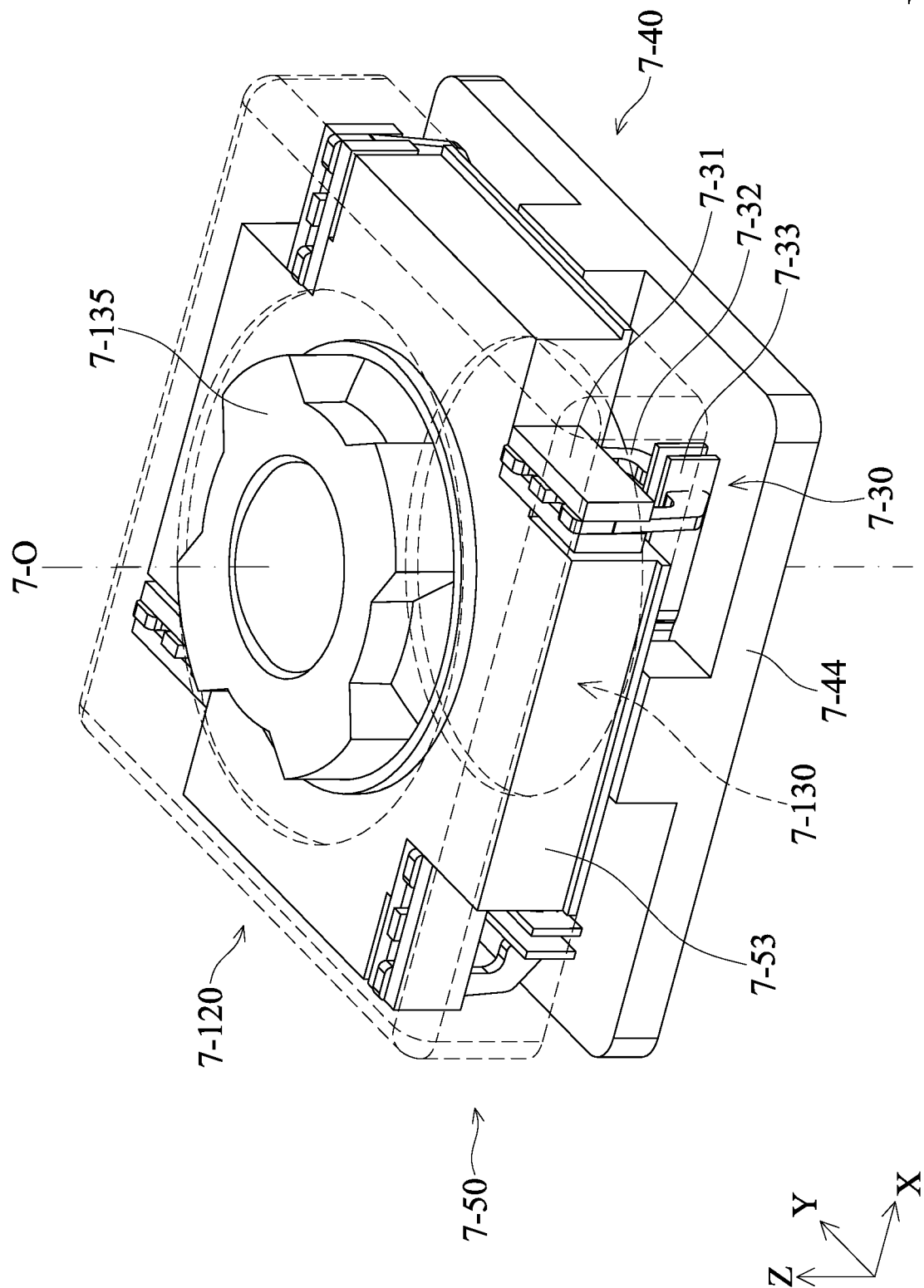
FIG. 16 shows a perspective view of the optical element driving mechanism and the optical element according to an embodiment of the present disclosure, wherein the outer frame is omitted.

Please refer to FIG. 16, the piezoelectric element 7-31 of the driving assembly 7-30 is in contact with the holder 7-53, and the connecting element 7-33 of the driving assembly 7-30 is in contact with the image sensor holder 7-44. That is, when the piezoelectric materials of the piezoelectric element 7-31 deform and make the deformation element 7-32 deforms by receiving the external current, the connecting element 7-33 moves along with the deformation element 7-32, thereby driving the image sensor holder 7-44 and the optical element 7-130 to move along the optical axis 7-O relative to the fixed part 7-50. Likewise, each one of the piezoelectric elements 7-31 and each one of the deformation elements 7-32 of the driving assembly 7-30 may move independently to enable the image sensor holder 7-44 of the movable part 7-40 to translate, rotate, or simultaneously rotate and translate. In this way, the light entering the optical element 7-135 and reaching the optical element 7-130 is subject to a zoom or focus by the translation, rotation, or simultaneous rotation and translation of the image sensor holder 7-44.

Figure 17:
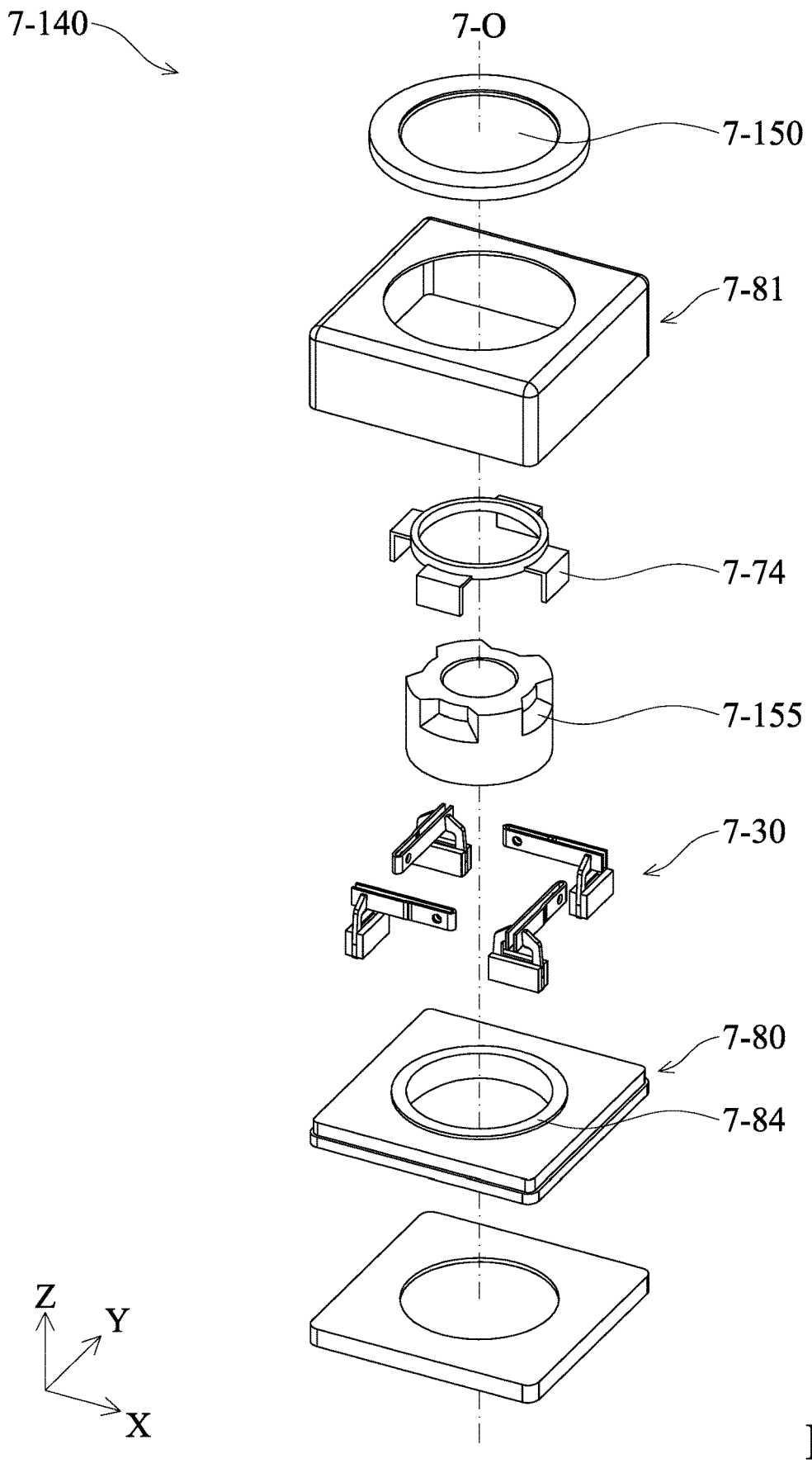
FIG. 17 shows an exploded view of the optical element driving mechanism and the optical element according to an embodiment of the present disclosure.

Please refer to FIG. 17, an optical element driving mechanism 7-140 of another embodiment of the present disclosure includes a movable part 7-70, a fixed part 7-80 and a driving assembly 7-30. Compared with the optical element driving mechanism 7-100, the movable part 7-70 of the optical element driving mechanism 7-140 has no holders, but the movable part 7-70 further includes a squeezing ring 7-74. The fixed part 7-80 further includes a holder 7-84. That is, in the present embodiment, the holder 7-84 is fixed on the fixed part 7-80. The features of the driving assembly 7-30 of the optical element driving mechanism 7-140 are the same as the features of the driving assembly 7-30 of the optical element driving mechanism 7-100. The main structures, functions and configuration of the optical element driving mechanism 7-140 same as the configuration of the elements of the optical element driving mechanism 7-100 are not repeated again. In the present embodiment, the optical element 7-150 is a liquid lens, while the optical element 7-155 is an ordinary lens.

Figure 18:
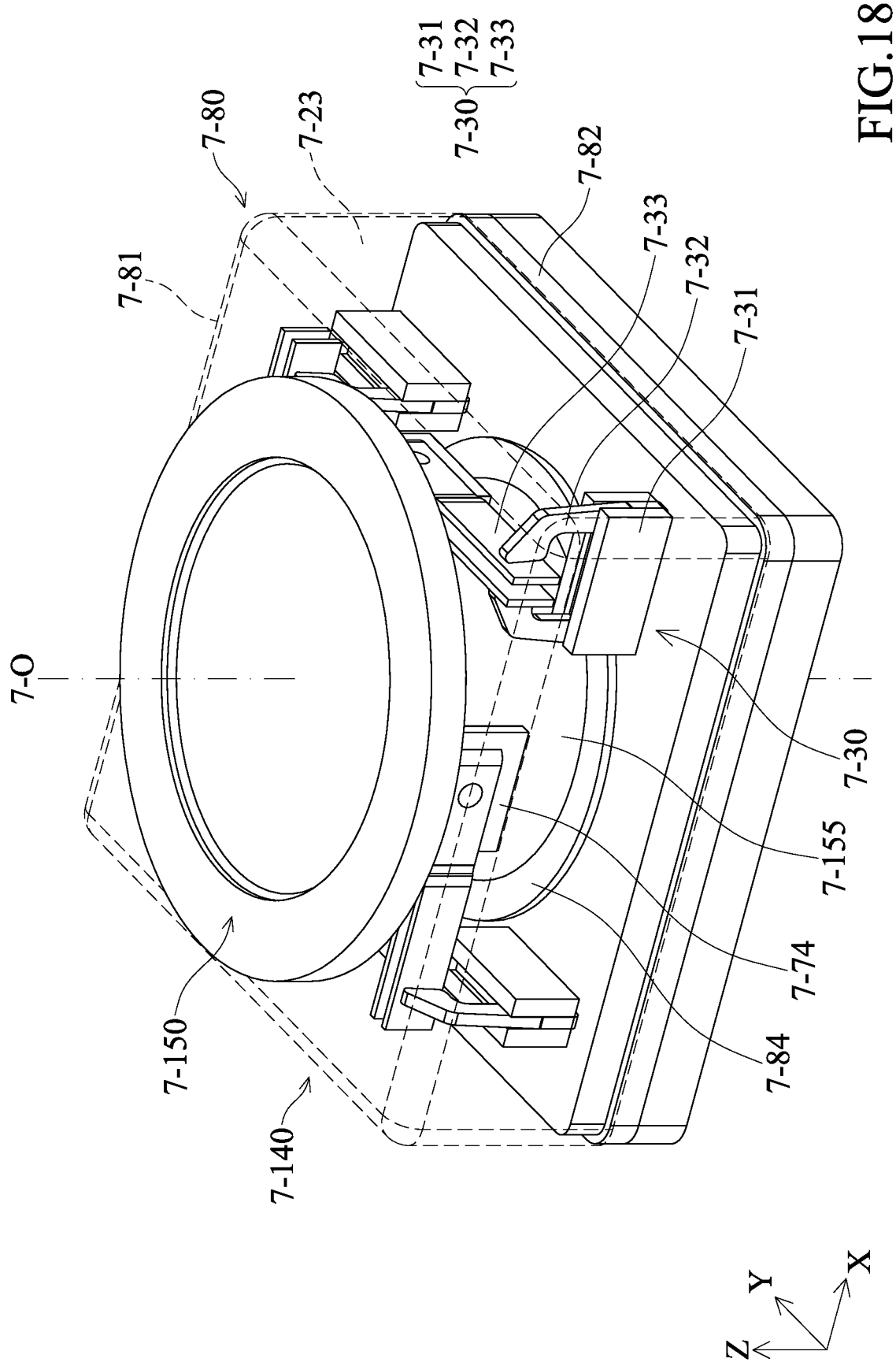
FIG. 18 shows a perspective view of the optical element driving mechanism and the optical element according to an embodiment of the present disclosure, wherein the outer frame is shown as a dash-line.

Please refer to FIG. 18, the liquid lens 7-150 is disposed on the outer frame 7-81 of the fixed part 7-80, and the squeezing ring 7-74 is disposed below the liquid lens 7-150. In the present embodiment, the driving assembly 7-30 is disposed on the fixed part 7-80, and the driving assembly 7-30 is in contact with the movable part 7-70. More specifically, the piezoelectric element 7-31 of the driving assembly 7-30 is in contact with the base 7-82 of the fixed part 7-80, and the connecting element 7-33 of the driving assembly 7-30 is in contact with the squeezing ring 7-74 of the movable part 7-70. When the piezoelectric materials of the piezoelectric element 7-31 deform and make the deformation element 7-32 deforms by receiving the external current, the connecting element 7-33 moves along with the deformation element 7-32, thereby driving the squeezing ring 7-74 to move along the optical axis 7-O relative to the fixed part 7-80, and the squeezing ring 7-74 squeezes the liquid lens 7-150. Likewise, each one of the piezoelectric elements 7-31 and each one of the deformation elements 7-32 may move independently so that the squeezing ring 7-74 may squeeze the liquid lens 7-150 in different ways.

Figure 19:
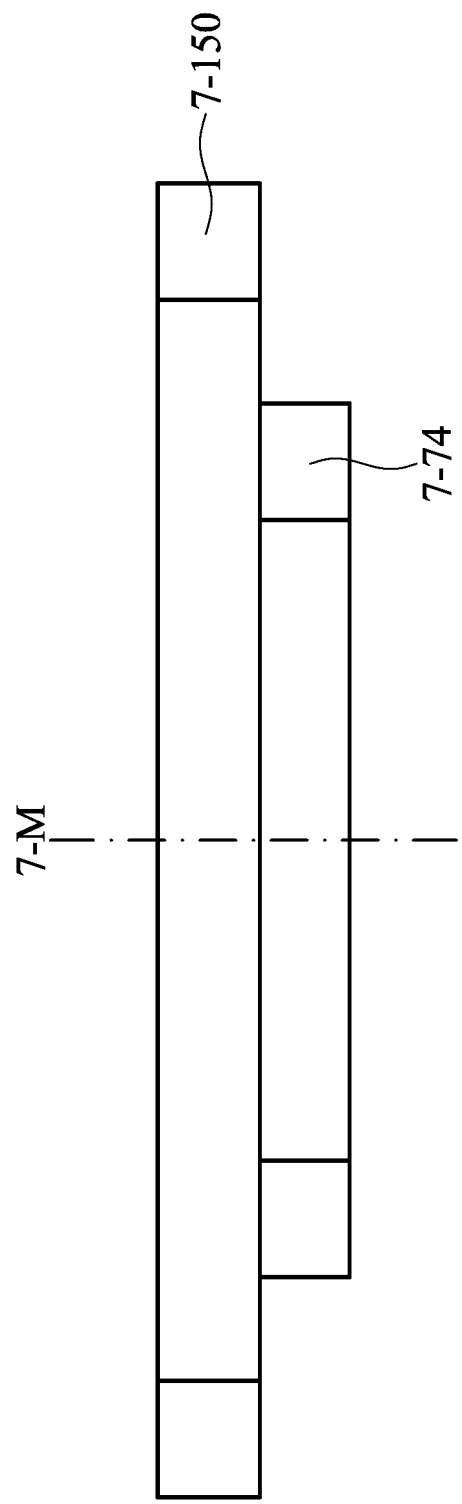
FIG. 19 shows a schematic view of the optical element and a squeezing ring of the optical element driving mechanism according to an embodiment of the present disclosure, wherein the squeezing ring is not squeezing the optical element.
Figure 20:
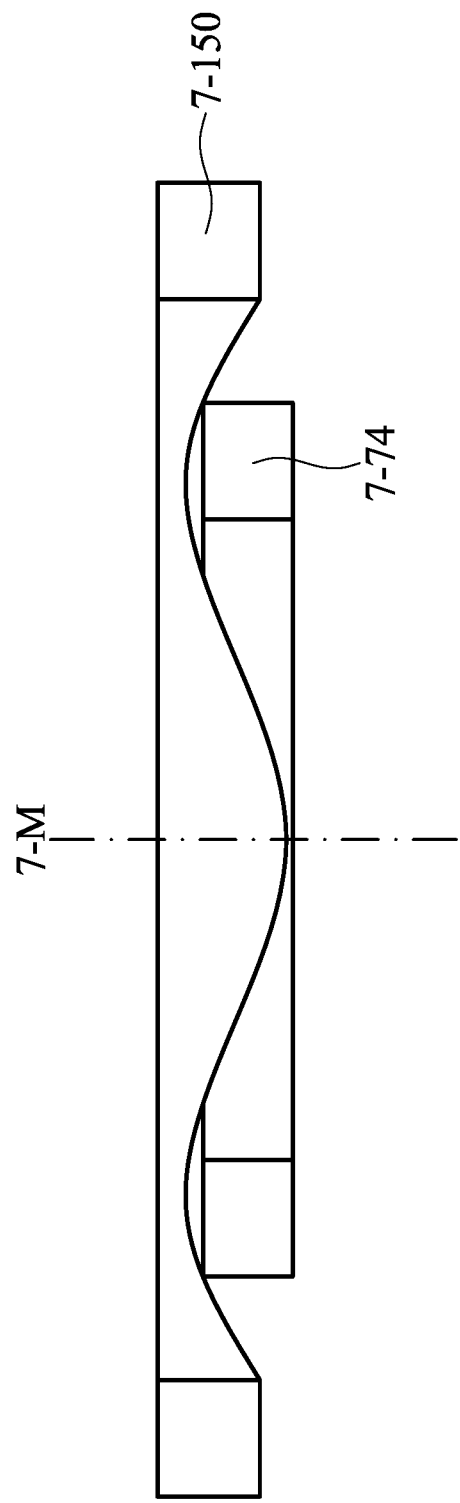
FIG. 20 shows a schematic view of the optical element and the squeezing ring of the optical element driving mechanism according to an embodiment of the present disclosure, wherein the squeezing ring is squeezing the optical element with an even force.
Figure 21:
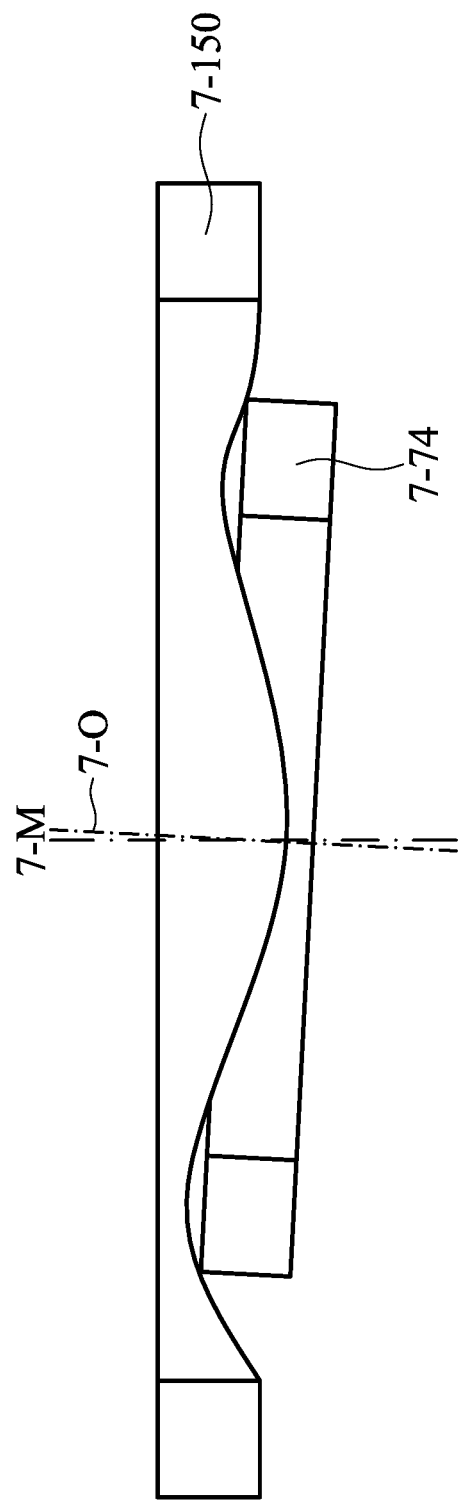
FIG. 21 shows a schematic view of the optical element and the squeezing ring of the optical element driving mechanism according to an embodiment of the present disclosure, wherein the squeezing ring is squeezing the optical element with an uneven force.

Please refer to FIG. 19, when the deformation element 7-32 does not deform (not shown in the Fig.), the squeezing ring 7-74 does not squeeze the liquid lens 7-150, the liquid lens 7-150 does not deform, the curvature of the liquid lens 7-150 is not changed, and the mirror centerline 7-M of the liquid lens 7-150 is not changed (that is, parallel to the optical axis 7-O). Please refer to FIG. 20, when the deformation element 7-32 deforms in uniform (not shown in the Fig.), and when the squeezing ring 7-74 squeezes the liquid lens 7-150 with an uniform force, the liquid lens 7-150 deforms, the curvature is changed, and the mirror centerline 7-M of the liquid lens 7-150 is not changed (that is, parallel to the optical axis 7-O). Please refer to FIG. 21, when the deformation element 7-32 deforms non-uniformly (not shown in the Fig.), and when the squeezing ring 7-74 squeezes the liquid lens 7-150 with a non-uniform force, the liquid lens 7-150 deforms, the curvature is changed, and the mirror centerline 7-M of the liquid lens 7-150 is changed (that is, not parallel to the optical axis 7-O). Therefore, the squeezing ring 7-74 enables the liquid lens to deform differently by the different deformation of the deformation element 7-32 to achieve the effect of optical focusing and optical image stabilization.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical element driving mechanism, having an optical axis, comprising:
   a movable part;

a fixed part, comprising a sidewall parallel to the optical axis; and a driving assembly, driving the movable part to move relative to the fixed part, wherein the sidewall is not in direct contact with the driving assembly, wherein the driving assembly comprises:

a deformation element, having a first end and a second end;

a piezoelectric element, in contact with the first end of the deformation element; and a connecting element, clamped by the second end of the deformation element, wherein the driving assembly drives the movable part to rotate about a direction perpendicular to the optical axis relative to the fixed part, wherein the movable part comprises a fixing element, the movable part is movably connected to the fixed part via the connecting element and the fixing element, and the connecting element comprises:

a first part, having a first surface, the first surface facing away from the movable part;

a second part, having a second surface, the second surface facing the movable part, and a shortest distance between the second surface and the fixing element is longer than a shortest distance between the first surface and the fixing element, wherein the second surface is in direct contact with the movable part.

2. The optical element driving mechanism as claimed in claim 1, wherein the fixed part further comprises a base, and the piezoelectric element is in direct contact with the base.

3. The optical element driving mechanism as claimed in claim 1, wherein the movable part comprises at least three sensing assemblies, and the at least three sensing assemblies detect the movement of the movable part relative to the fixed part.

4. The optical element driving mechanism as claimed in claim 1, wherein the piezoelectric element drives the deformation element to deform, and the piezoelectric element and the deformation element have plate structures.

5. The optical element driving mechanism as claimed in claim 4, wherein the driving assembly comprises at least two piezoelectric elements and at least two deformation elements, and each one of the piezoelectric elements independently drives the corresponding deformation element.

6. The optical element driving mechanism as claimed in claim 4, wherein an extending direction of the piezoelectric element and the deformation element is parallel to the optical axis.

7. The optical element driving mechanism as claimed in claim 4, wherein the connecting element abuts the deformation element by a friction force.

8. The optical element driving mechanism as claimed in claim 7, wherein the connecting element is a U-shaped structure.

9. The optical element driving mechanism as claimed in claim 7, wherein the connecting element comprises a non-linear first part and a linear second part.

10. The optical element driving mechanism as claimed in claim 7, wherein the deformation element comprises a contacting surface in contact with the connecting element, and the contacting surface is rigid.

11. The optical element driving mechanism as claimed in claim 7, wherein the connecting element is in contact with the movable part.

12. The optical element driving mechanism as claimed in claim 1, wherein the first part further comprises a first opening, the second part further comprises a second opening, and a size of the first opening is smaller than a size of the second opening.

13. The optical element driving mechanism as claimed in claim 1, wherein the fixing element has a first size located at the first surface and a second size located at the second surface, and the first size is greater than the second size.

14. The optical element driving mechanism as claimed in claim 1, wherein the first surface and the second surface at least partially overlap the fixing element when observed along the optical axis.

15. The optical element driving mechanism as claimed in claim 1, wherein the fixed part further comprises an outer frame, and a gap is provided between the outer frame and the driving assembly.

16. The optical element driving mechanism as claimed in claim 1, wherein the piezoelectric element and the deformation element are in direct contact with and are fixed to the fixed part.

17. The optical element driving mechanism as claimed in claim 1, wherein a part of a lower half part of the deformation element is downwardly expose from the piezoelectric element in part, wherein the part of the lower half part of the deformation element is in contact with and are fixed to the fixed part.

18. The optical element driving mechanism as claimed in claim 17, further comprising a supporting structure, disposed between the deformation element and the fixed part, wherein the middle part of the lower half part of the deformation element may be provided with a first glue, and the two sides parts of the lower half part of the deformation element are provided with a second glue, wherein the first glue is harder than the second glue.

19. An optical element driving mechanism, having an optical axis, comprising:

a movable part;

a fixed part, comprising a sidewall parallel to the optical axis; and a driving assembly, driving the movable part to move relative to the fixed part, wherein the sidewall is not in direct contact with the driving assembly, wherein the driving assembly comprises:

a deformation element, having a first end and a second end;

a piezoelectric element, in contact with the first end of the deformation element; and a connecting element, clamped by the second end of the deformation element, wherein the fixed part further comprises an outer frame, and a gap is provided between the outer frame and the driving assembly, wherein the optical element is a liquid lens, and the liquid lens is disposed on the outer frame.

20. The optical element driving mechanism as claimed in claim 19, wherein the movable part comprises a squeezing ring, and the driving assembly drives the squeezing ring to contact the liquid lens.

* * * * *